(12) United States Patent
Morrow et al.

(10) Patent No.: US 12,509,289 B2
(45) Date of Patent: Dec. 30, 2025

(54) TRAY WITH REMOVABLE INSERT

(71) Applicant: TOPPAN THERMOFORMED PACKAGING HOLDINGS, INC., Charlotte, NC (US)

(72) Inventors: J. Mark Morrow, Camden, SC (US); Travis Figgins, North Canton, OH (US)

(73) Assignee: TOPPAN THERMOFORMED PACKAGING HOLDINGS, INC., Charlotte, NC (US)

( * ) Notice: Subject to any disclaimer, the term of this patent is extended or adjusted under 35 U.S.C. 154(b) by 0 days.

(21) Appl. No.: 18/796,743

(22) Filed: Aug. 7, 2024

(65) Prior Publication Data

US 2024/0391675 A1 Nov. 28, 2024

Related U.S. Application Data

(60) Division of application No. 18/131,921, filed on Apr. 7, 2023, now Pat. No. 12,084,257, which is a continuation of application No. 17/175,873, filed on Feb. 15, 2021, now Pat. No. 11,649,103.

(51) Int. Cl.
| | |
|---|---|
| *B65D 81/26* | (2006.01) |
| *B65D 1/34* | (2006.01) |
| *B65D 25/10* | (2006.01) |

(52) U.S. Cl.
CPC ............ *B65D 81/262* (2013.01); *B65D 1/34* (2013.01); *B65D 25/108* (2013.01)

(58) Field of Classification Search
CPC .... B65D 81/262; B65D 81/261; B65D 81/26; B65D 81/24; B65D 1/34; B65D 1/03; B65D 1/40; B65D 1/42; B65D 1/44; B65D 25/108
See application file for complete search history.

(56) References Cited

U.S. PATENT DOCUMENTS

| | | | |
|---|---|---|---|
| 3,151,799 A | * | 10/1964 | Engles, Jr. ........... B65D 81/262 D9/425 |
| D249,238 S | * | 9/1978 | Limon .......................... D9/425 |
| 6,619,501 B2 | | 9/2003 | Hayes et al. |
| 7,762,400 B2 | | 7/2010 | Hall et al. |

(Continued)

FOREIGN PATENT DOCUMENTS

| | | |
|---|---|---|
| AU | 2015202616 A1 | 12/2015 |
| GB | 1131848 A | 10/1968 |
| JP | 2006036316 A | 2/2006 |

OTHER PUBLICATIONS

International Search Report and Written Opinion issued in International Application No. PCT/US2022/011088; Dated Apr. 7, 2022; 14 pages.

*Primary Examiner* — Javier A Pagan

(74) *Attorney, Agent, or Firm* — Nelson Mullins Riley & Scarborough LLP

(57) ABSTRACT

The invention comprises a container for food products that extrudate liquids comprising a tray and a bowed insert. The tray bottom wall has at least one raised area, at least one lower surface, and at least one sidewall. A plurality of flutes are disposed on the inner surface sidewall(s). A plurality of elevated portions extend upwardly from the bowed insert. The insert is secured within the tray. A reservoir is defined between the insert and the tray bottom wall. The elevated portions of the insert, the flutes, and the at least one raised area of the tray bottom define a plurality of channels.

20 Claims, 12 Drawing Sheets

(56) References Cited

U.S. PATENT DOCUMENTS

| | | | |
|---|---|---|---|
| 7,921,992 B2 * | 4/2011 | LaRue | B65D 81/265 |
| | | | 206/557 |
| 8,474,610 B1 * | 7/2013 | Knight | B65D 81/262 |
| | | | 229/407 |
| 9,302,842 B2 * | 4/2016 | Wallace | B65D 51/28 |
| 10,173,824 B2 | 1/2019 | Van Den Broek et al. | |
| 10,414,571 B2 | 9/2019 | Wallace | |
| 11,649,103 B2 | 5/2023 | Morrow et al. | |
| 2018/0273232 A1 | 9/2018 | Wallace | |
| 2019/0002140 A1 | 1/2019 | Riley et al. | |
| 2019/0152678 A1 | 5/2019 | Wallace | |
| 2020/0165026 A1 | 5/2020 | Thoma et al. | |
| 2020/0180842 A1 | 6/2020 | Schiltz et al. | |
| 2020/0207533 A1 | 7/2020 | Riley et al. | |
| 2020/0255173 A1 | 8/2020 | Riley et al. | |

\* cited by examiner

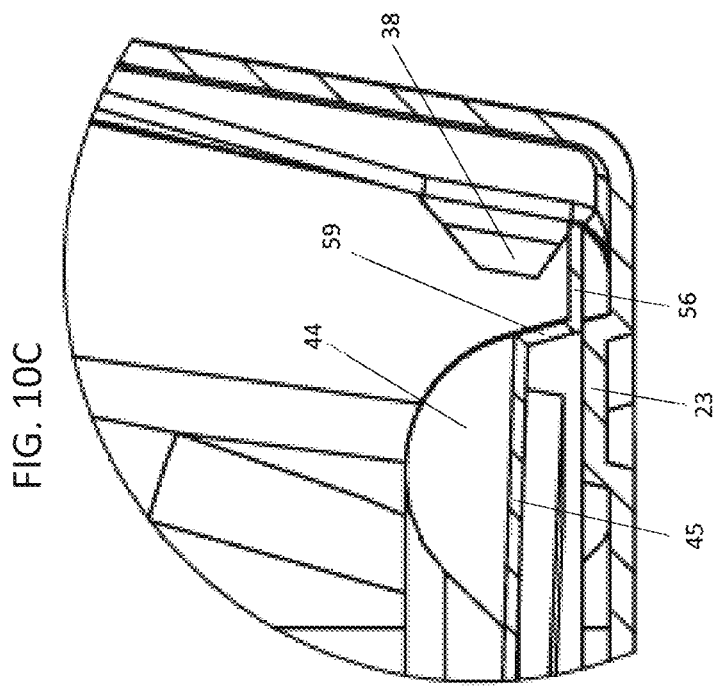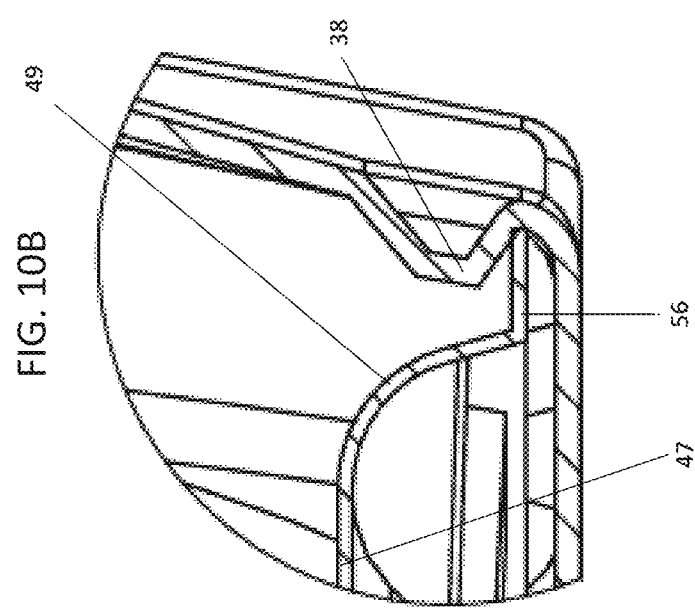

TRAY WITH REMOVABLE INSERT

CROSS-REFERENCE TO RELATED APPLICATIONS

This application is a divisional of U.S. patent application Ser. No. 18/131,921 filed Apr. 7, 2023, entitled "TRAY WITH REMOVABLE INSERT", which is a continuation of U.S. patent application Ser. No. 17/175,873, filed Feb. 15, 2021, entitled "TRAY", now U.S. Pat. No. 11,649,103 which are incorporated herein in their entirety.

FIELD OF THE INVENTION

The present invention relates generally to a self-draining tray for food products which release extrudate, such as fresh meats.

BACKGROUND

Existing trays for fresh meat products typically utilize an absorbent pad positioned directly beneath the meat product. The absorbent pad is designed to capture or collect and retain extrudate that drains out of the meat, such as water, blood etc. The absorbent pad poses a problem for recycling centers, however, because consumers often fail to remove the pad from the tray before depositing it into the recycling stream. The tray cannot be recycled in this format. Through hard work and ingenuity, the inventors have developed a tray for meat products which drains the extrudate from the meat product, securely separates the extrudate from the meat product during shelf storage, and is fully recyclable.

BRIEF DESCRIPTION OF THE DRAWING(S)

Having thus described the disclosure in general terms, reference will now be made to the accompanying drawings, which are not necessarily drawn to scale, and wherein:

FIG. 10B illustrates an exploded cross-sectional view of the insert peripheral flange through line B-B in FIG. 10A.

FIG. 10C illustrates an exploded cross-sectional view of the insert peripheral flange through line A-A in FIG. 10A.

SUMMARY

Figure 1:
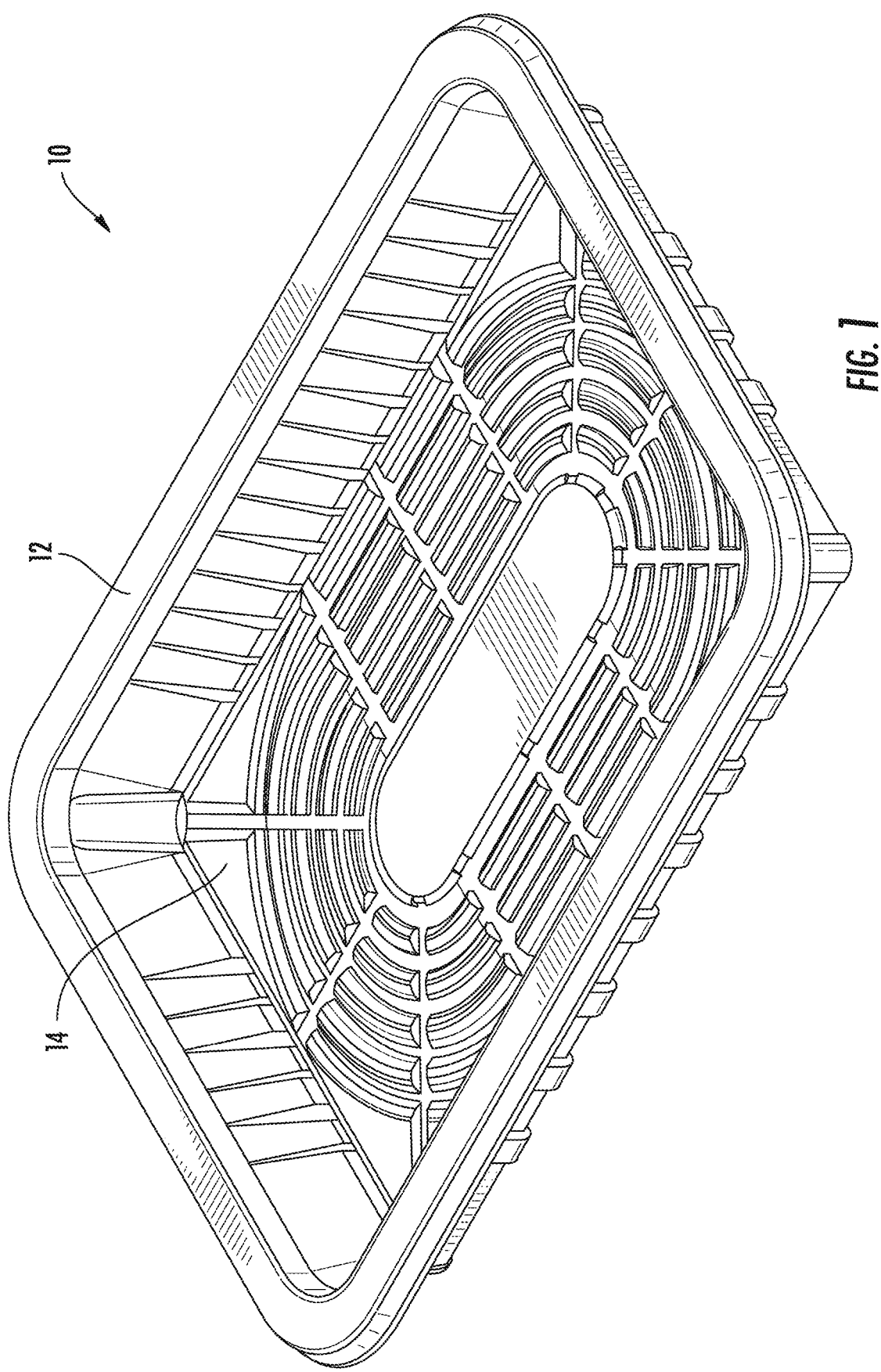
FIG. 1 illustrates a perspective view of a tray and removable insert of the present invention.

In an embodiment, the inventors have developed a fully recyclable tray package for meats, vegetables, or other products that produce extrudate. The inventive tray utilizes a polymeric insert, optionally made from polyethylene terephthalate, to allow the extrudate (juices, liquids, blood, and/or water) to drain away from the meat. The tray itself may also comprise a polymeric material that is recyclable in the same stream as the insert, such as polyethylene terephthalate. Any polymeric material known in the art may be utilized for the tray and/or the insert, however. In an embodiment, the tray and the insert are thermoformed. In some embodiments, the polymeric tray and/or insert may be transparent, translucent, or opaque.

The inventive design minimizes the contact of the extrudate with the meat. In one embodiment, the polymeric insert may be placed into the tray to form a false bottom during the tray manufacturing process. Similarly, the insert can be placed into the tray at a food processor's filling line, prior to the placement of the meat product. While the specification may largely refer to meat products, the invention should not be so limited. The tray and insert of the invention could be utilized in connection with seafood, produce, fruit, or any other food product which extrudates liquids, such as sliced tomatoes.

In an embodiment, the insert has one or more edges which engage locking detents on the inside walls of the tray to retain it in place. The insert may additionally be tapered downward on one or more sides to facilitate drainage. In an embodiment, grooves are disposed in the insert to direct the extrudate to the side edges of the insert. The extrudate may then drain down the sidewalls of the tray and may be captured in the bottom or base of the tray. In an embodiment, there may be strategically placed, elevated elements in the tray base which prevent or minimize the extrudate from moving upwardly to during transportation or consumer handling. In an embodiment, the base of the tray may be designed with grooves to create an arduous path for the extrudate. The grooves may additionally aid in creating more surface tension in the extrudate, which may further maintain the liquid in the base of the tray. The base of the tray may be designed in such a manner to also support the insert when the meat product is introduced to the package. In some embodiments, the tray base and/or the insert may be opaque to minimize the visual observation of the extrudate.

In an aspect, the invention is directed to a container comprising a tray, an insert, and a locking mechanism. In an embodiment, the tray comprises a bottom wall having a perimeter, at least one raised area, and at least one lower surface; at least one sidewall extending upwardly from the perimeter of the bottom wall and terminating at a rim, the at least one sidewall having an inner, product facing surface; and a plurality of vertically oriented concave flutes disposed on the inner surface of the at least one sidewall, the flutes extending from an upper portion of the tray at least one sidewall to the tray bottom wall. In an embodiment, the insert comprises a bowed surface terminating in a peripheral edge; a plurality of elevated portions extending upwardly from the bowed surface; and a locking mechanism which removably affixes the insert to the tray. When affixed to the tray, the bowed surface of the insert may be removably disposed on the at least one raised area of the bottom wall of the tray. A reservoir may be defined between the insert and the at least one lower surface of the tray bottom wall and the elevated portions of the insert, the flutes, and the at least one raised area of the tray bottom may define a plurality of channels which direct extrudate to the reservoir.

In an embodiment, the locking mechanism comprises a plurality of inwardly-directed locking detents located along a lower portion of the tray at least one sidewall, above the bottom wall, and a flange extending horizontally outward from the peripheral edge of the insert, wherein the insert is secured within the tray by positioning the insert flange under the locking detents. In an embodiment, the plurality of dams project upwardly from the bottom wall, each dam positioned between a flute and the interior of the tray, wherein the dams have a width that is at least as wide as a width of the flutes. In an embodiment, the plurality of dams comprise isosceles trapezoids comprising a longer base wall, a shorter base wall, and two leg walls and wherein the shorter base wall faces the flute.

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 2:
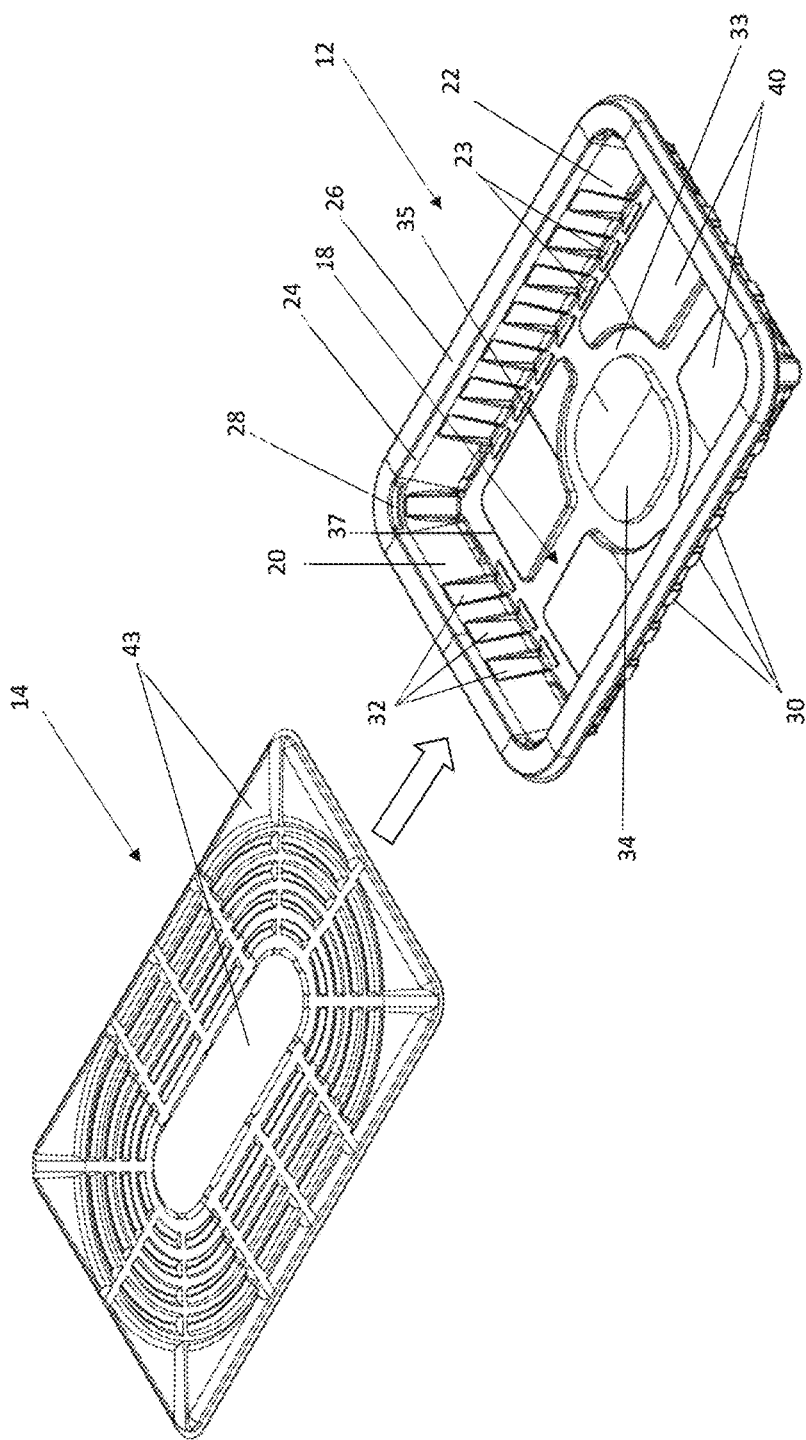
FIG. 2 illustrates a perspective view of a tray and removable insert of the present invention, wherein the insert is removed from the tray.
Figure 3:
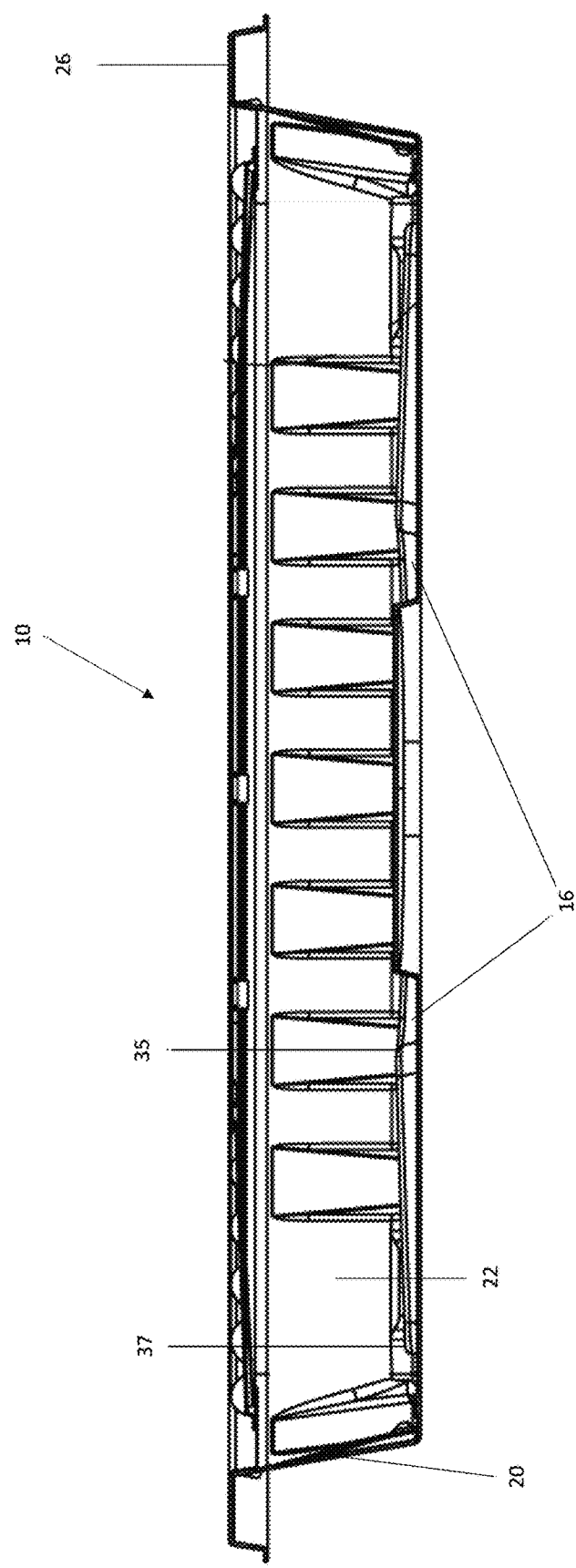
FIG. 3 illustrates a side view of a tray and removable insert of the present invention, wherein the insert is positioned near the top of the tray.

FIGS. 1 through 3 illustrate a container 10 for holding a food product. The container 10 comprises a tray 12 and an insert 14 that fits within the tray 12, near the tray bottom wall 18. In an embodiment, when the insert 14 is disposed within the tray 12, a reservoir 16 is created between the insert 14 and the tray bottom wall 18. While the preferred embodiment of the invention avoids the need for an absorbent pad, an absorbent bad could be utilized in the reservoir 16 between the insert 14 and the tray bottom wall 18, if desired. In another embodiment, a surface desiccant could be utilized between the insert 14 and the tray bottom wall 18. In an embodiment, the desiccant could be sprayed onto the tray bottom wall 18 or the underside of the insert 14. The desiccant may comprise any composition which absorbs moisture or holds moisture through surface adhesion forces. Preferably any such desiccant would not inhibit the recyclability of the container 10.

In addition to the bottom wall 18, the tray 12 comprises at least one sidewall. In an embodiment, the tray 12 comprises four sidewalls. In a particular embodiment, the tray 12 comprises two short sidewalls 20 and two long sidewalls 22, each extending upwardly from the perimeter of the bottom wall 18. The sidewalls 20, 22 may terminate in a rim 24. The rim 24 may be square, circular, or rectangular, in an embodiment. It will be understood that the rim may take any shape, based upon the configuration of the sidewalls. A flange 26 may extend horizontally outwardly or inwardly from the rim 24 and may be configured to receive a lid (not shown) or support a flexible film cover. Horizontally oriented stacking grooves 28 may be disposed along the corners of the rim 24 of the tray 12, in an embodiment, and may facilitate stacking of multiple trays 12, one upon another.

In an embodiment, the sidewalls 20, 22 may comprise a plurality of integrally formed, vertically oriented, outwardly extending ribs 30. The ribs 30, being convex when viewed from the tray exterior, may define vertically oriented concave flutes 32 on the inner surfaces of the sidewalls 20, 22. Alternatively, the vertically oriented concave flutes 32 may be formed in an otherwise flat sidewall. In any case, the flutes 32 may extend horizontally into, through, or from the sidewalls 20, 22 any depth. Likewise, the flutes 32 may extend vertically through the sidewalls 20, 22 any distance, but preferably extend at least from a position that is above the insert 14 (when the insert 14 is snapped into the tray 12) downwardly to the bottom wall 18. In an embodiment, the flutes 32 may extend from a position at or near the rim 24 of the tray 12 to the tray bottom wall 18. In an embodiment, the flutes 32 serve as channels through which extrudate may drain into the reservoir 16 below the insert 14.

In an embodiment, a dam 23 is provided near the base of each flute 32. In an embodiment, a plurality of dams 23 are provided. In an embodiment, the number of dams coincides with the number of flutes 32. Each dam 23 may force the draining extrudate to flow from each flute, around each dam 23, and toward the center of the tray 12. In addition, the dams 23 may prevent or reduce the likelihood that the extrudate, once in the reservoir 16, will move upwardly or splash upwardly into the flutes 32, as the dams 23 may block the extrudate from the flutes 32 once the extrudate is in the reservoir 16. Each dam 23 may be an elongated element that is at least at wide as a flute 32. In an embodiment, the dam 23 may be wider than the width of an adjacent flute 32. In an embodiment, the dams 23 may be positioned at the base of the flute 32. In an embodiment, the dams 23 are formed integrally with surface 45 of the tray 12. In an embodiment, the dams 23 may be elevated above the surface 45 of the tray. In an embodiment, the dams 23, viewed in top view, may be rectangular, ovular, trapezoidal, or any other shape known in the art. In an embodiment, the dams 23, viewed in top view, may comprise isosceles trapezoids have two base walls and two leg walls. In an embodiment, the shorter base wall of the isosceles trapezoid dam 23 faces the flute 32. In this embodiment, the extrudate is more likely to flow easily into the reservoir 16 but will have a more arduous path flowing around the longer base wall of the dam 23 to exit the reservoir and enter a flute 32.

In an embodiment, the tray bottom wall 18 may be contoured and may include one or more lower surfaces 33 and one or more raised areas 34. The lower surfaces 33 and raised areas 34 may be configured in many configurations and should not be limited to those set forth in the figures. In an embodiment, one raised area 34 may be centrally located and may be circular, ovular, rectangular, square, or any other shape known in the art. In an embodiment, the central raised area 34 may be partially or fully surrounded by a lower surface 33. The lower surface 33 that surrounds the central raised area 34 may be in the form of a trough or moat. The lower surface 33 that surrounds the central raised area 34 may completely or partially surround the central raised area 34. In an embodiment, the lower surface 33 that surrounds the central raised area 34 may be connected to one or more lower surfaces 33 which extend therefrom. For example, four additional lower surfaces 33 may extend outwardly from the central portion, toward the sidewalls 20, 22. One or more raised areas 34 may additionally positioned about the bottom wall 18. For example, a peripheral raised area 40 may be disposed near each corner of the bottom wall 18. In an embodiment, the peripheral raised areas 40 are radially oriented about the central raised area 34. In an embodiment, the raised areas 34, 40 extend upwardly, into the container receptacle, and above the lower surface 33.

Figure 4:
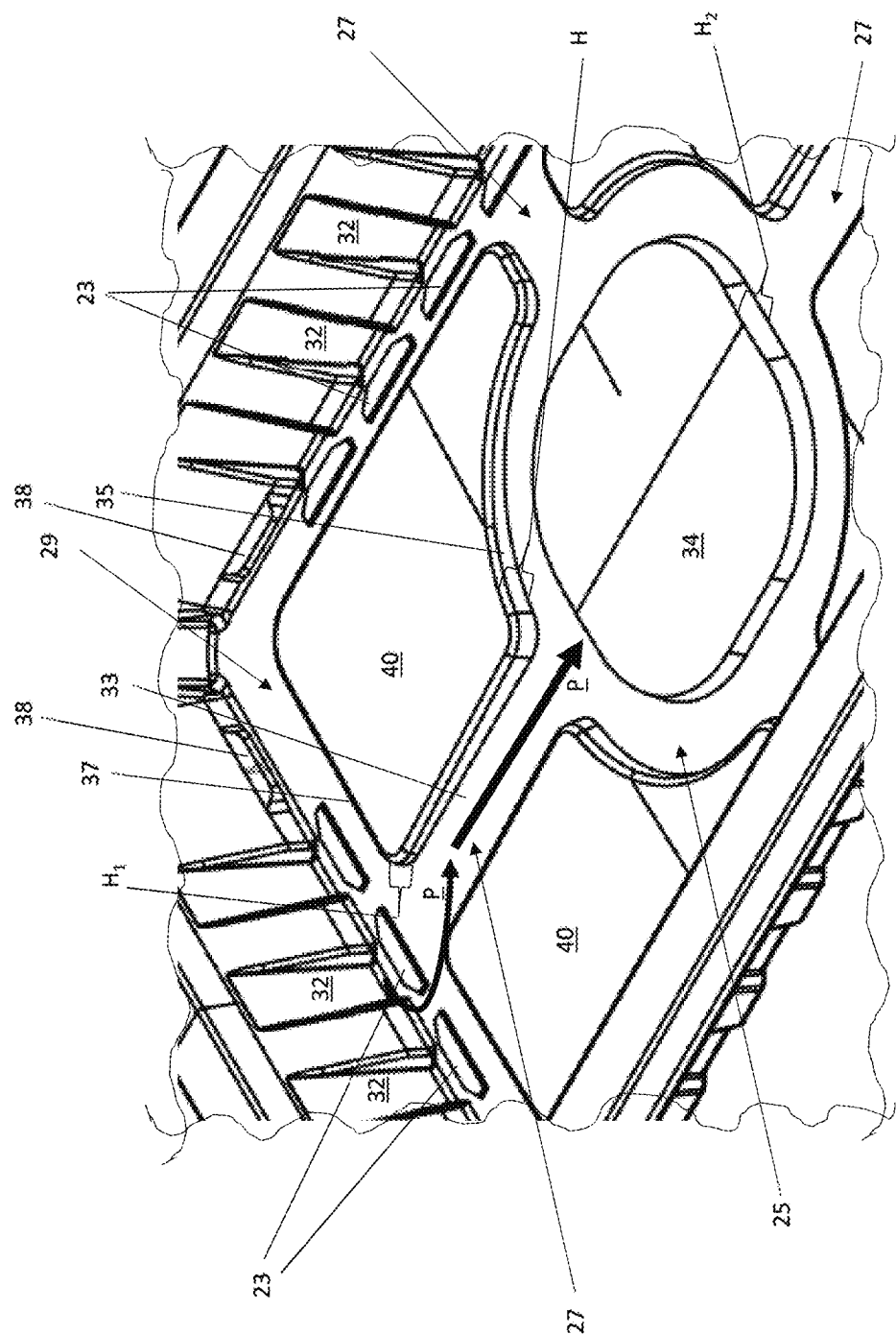
FIG. 4 illustrates an exploded view of the interior bottom surface of the tray in an embodiment of the invention.

In a particular embodiment, one or more of the peripheral raised areas 40 may be angled such that the innermost height H of the peripheral raised area 40 (i.e. nearest the central raised area 34) is greater than the outermost height H₁ of the peripheral raised area 40 (i.e. nearest the sidewalls 20, 22) (see FIG. 4). In an embodiment, the angle between the inner edge 35 of the peripheral raised area 40 and the outer edge 37 of the peripheral raised area 40 may be between about 1 degree and about 5 degrees. In another embodiment, the angle between the inner edge 35 of the peripheral raised area 40 and the outer edge 37 of the peripheral raised area 40 may be between about 1 degree and about 3 degrees. In yet another embodiment, the angle between the inner edge 35 of the peripheral raised area 40 and the outer edge 37 of the peripheral raised area 40 may be about 2 degrees. Such a configuration may aid in draining of extrudate from the middle region of the tray 12 and/or insert 14 toward the sidewalls 20, 22. The peripheral raised areas 40 may comprise any shape known in the art. In an embodiment, the peripheral raised areas 40 may be elongated, square, rectangular, circular, ovular, or irregularly shaped.

In an embodiment, the height H₂ of the central raised area 34 may be the same as or nearly the same as the height of the inner edge 35 of the peripheral raised area 40. In an embodiment, the height H₂ of the central raised area 34 is consistent across its length and width and is not angled.

In an embodiment, the lower surface 33 comprises one or more channels. For example, the lower surface 33, in relation to the raised areas 34, 40, may form one or more first channels 25 about the central raised area 34, one or more second channels 27 between the peripheral raised areas 40, and one or more third channels 29 surrounding the entirety of the raised areas 34, 40. In an embodiment, the channels 25, 27, 29 may be connected to one another such that extrudate may flow from one channel to another. In other embodiments, the channels 25, 27, 29 may be separated from one another and may each retain extrudate from time to time.

Figure 5:
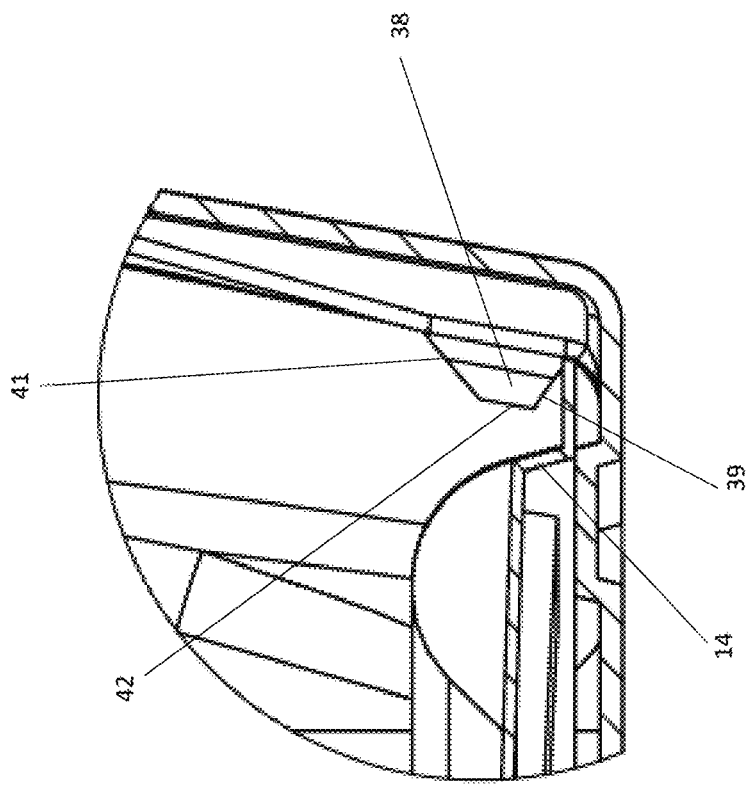
FIG. 5 illustrates an exploded cross-sectional view of the interior of the tray and insert in an embodiment of the invention.
Figure 6:
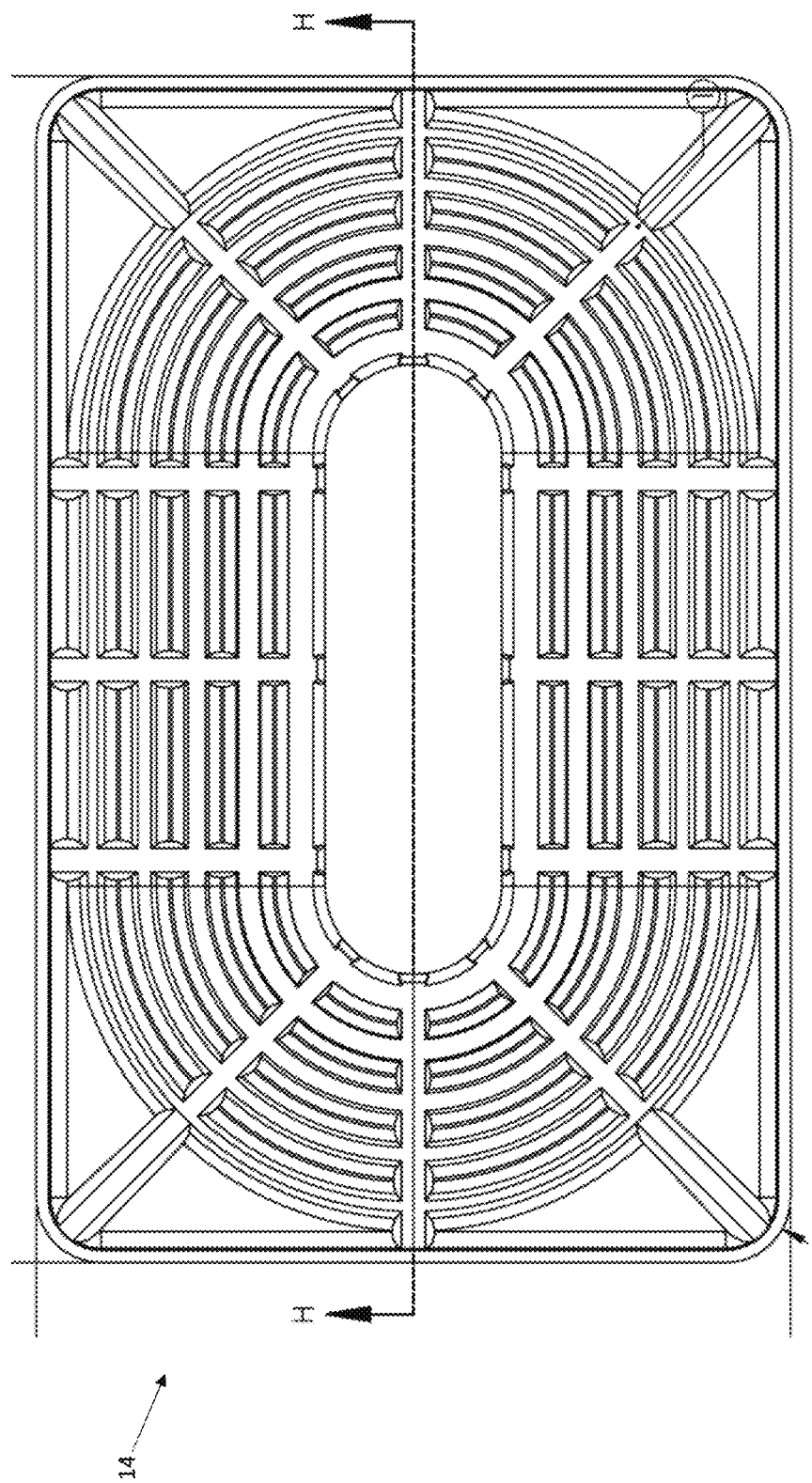
FIG. 6 illustrates a top view of the insert in an embodiment of the invention.

In an embodiment, the tray 12 and insert 14 comprise a locking mechanism which secures the insert within the tray. In an embodiment, the locking mechanism is a removable lock—in that the insert may be secured within the tray but may be removable. In one embodiment, the locking mechanism may comprise locking detents on the tray 12 and a flange on the insert 14. More particularly, in an embodiment, the tray 12 further includes one or more inwardly directed locking detents 38 located along a lower portion of the tray sidewalls 20 and/or 22 just above the bottom wall 18, as shown in FIG. 5. In an embodiment, the detents 38 are horizontally oriented. The detents 38 may be disposed along only each short sidewall 20, only each long sidewall 22, or another both the long and short sidewalls 20, 22. In an embodiment, the detents 38 may be substantially wedge shaped and comprise a curved, sloped, or angled upper surface 41 and a sloped lower surface 39. In an embodiment, the upper surface 41 and the lower surface 39 may meet at an apex or convex curve. In other embodiments, the upper surface 41 and the lower surface 39 may each be adjacent and connect to flattened inner surface 42. In other embodiments, the detents 38 may be substantially triangular, rounded, squared, or any other shape or configuration known in the art to retain the insert 14.

In an embodiment, the locking detents 38 are designed to capture the insert 14 and hold it in place. Thus, the angle and configuration of the upper surface 41, lower surface 39, and inner surface 42 may be such that the insert 14 can slide over the upper surface 41 and inner surface 42 upon insertion and be locked in place beneath the lower surface 39 of the detents 38. The plurality of detents 38 could be replaced by one elongated detent 38 in an embodiment.

In another embodiment, the locking mechanism may comprise one or more concave indents located along a lower portion of the tray sidewalls 20 and/or 22 just above the bottom wall 18. The indents may take any shape or configuration known in the art, in an embodiment. In this embodiment, the perimeter of the insert may comprise tabs or extension elements which can be snap-fit into the indents to secure the tray in place. In an embodiment, the tabs may be compressible such that their shape compresses to fit into the indents and then expands once in the indents. In an embodiment, the number of indents and tabs may vary, but should correlate in number and positioning. Any other locking mechanism known in the art which secures the insert 14 within the tray 12 may also or alternatively be utilized in the invention.

Figure 7:
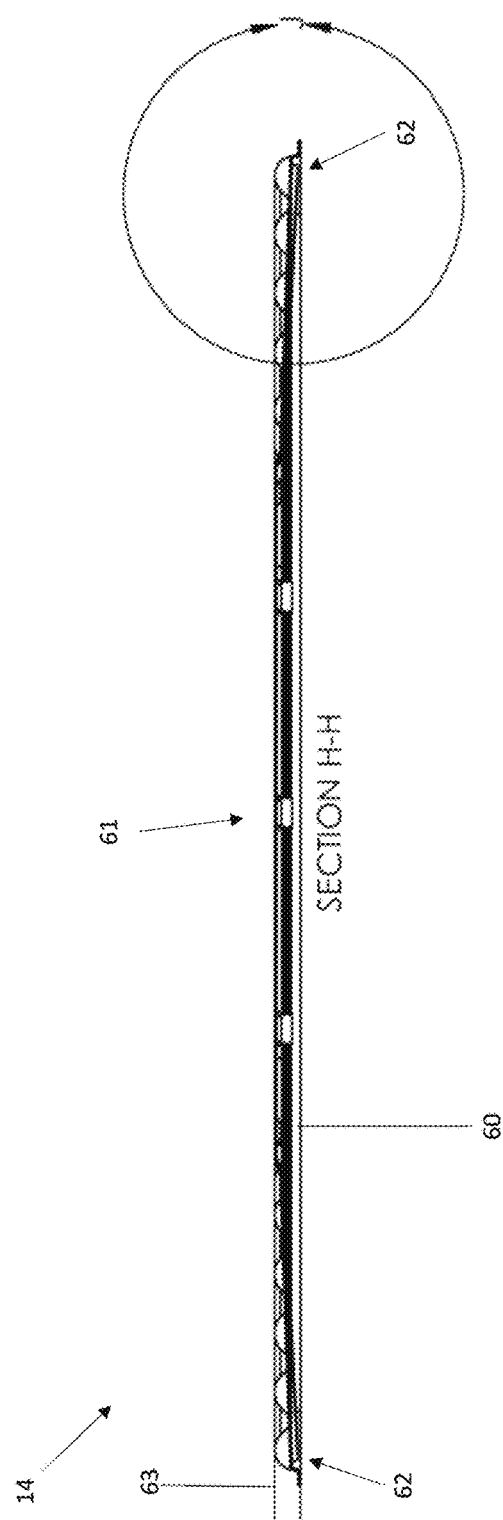
FIG. 7 illustrates a side view of the insert in an embodiment of the invention.
Figure 8:
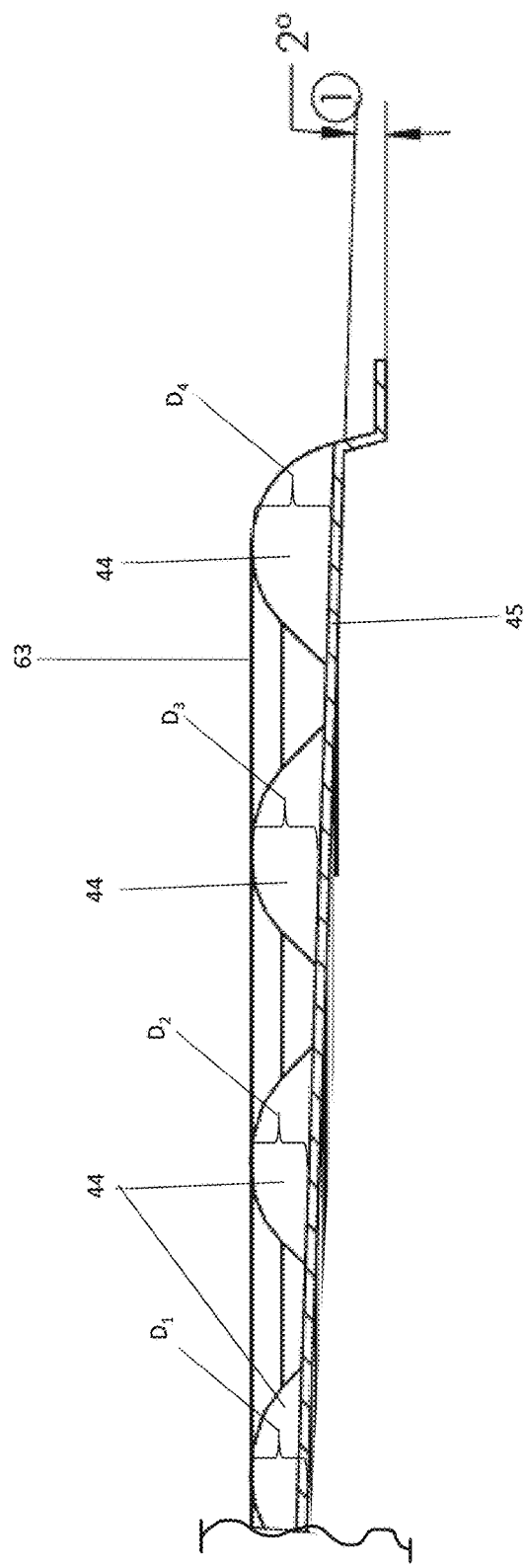
FIG. 8 illustrates an exploded cross-sectional view of the insert in an embodiment of the invention.

In an embodiment, the insert 14 may be sized and configured to fit within the tray 12. In an embodiment, the insert 14 may be square or rectangular. In an embodiment, the insert 14 may be sized and configured to be snap-fit into the tray 12. The insert 14 may be semi-rigid so that it can be deformed to pass over the upper surface 41 and inner surface 42 and fit below the detents 38 when inserted into the tray 12 and still support the weight of a food product on top of the insert 14. The insert 14 may comprise a bowed surface 45, in an embodiment. In an embodiment, the bowed surface 45 is convex. In this embodiment, the term bowed surface 45 means that the midsection 61 of the insert 14 may be disposed further from a horizontal plane 60 than the end portions 62 of the insert (see FIGS. 7 and 8). In an embodiment, the angle between the horizontal plane 60 and the center of the bowed surface 45 may be between about 1 degree and about 5 degrees. In another embodiment, the angle between the horizontal plane 60 and the center of the bowed surface 45 may be between about 1 degree and about 3 degrees. In yet another embodiment, the angle between the horizontal plane 60 and the center of the bowed surface 45 may be about 2 degrees. This configuration may allow drainage from the central portion of the insert 14 and toward the edges of the insert 14.

In an embodiment, the insert 14 may comprise a plurality of elevated portions, in various shapes and configurations. The invention should not be limited to the configurations shown, as any configuration of elevated portions may be utilized.

In an embodiment, the elevated portions comprise an elevated central portion 43. The central portion 43 may comprise any shape known in the art, such as a circle, oval, ellipse, square, rectangle, or an irregular shape. In addition, one or more peripheral elevated portions 47 may be disposed at or near the four corners of the insert 14. In an embodiment, the central elevated portion 43 and/or the peripheral elevated portions 47 may connect to the surface 45 via a convex curved portion 49. One or more central portion channels 51 may be formed within the convex curved portion 49 of the central elevated portion 43. These central portion channels 51 may encourage extrudate to flow through one or more paths P toward the outer periphery of the insert 14. In addition, channels 55 may be formed between adjacent peripheral elevated portions 47 (see FIG. 9B). The peripheral elevated portions channels 55 may be formed as each peripheral elevated portion 47 meets the surface 45 via a concave curved portion or angled portion 57. In an embodiment, an obtuse angle may be formed between angled portion 57 and surface 45.

In an embodiment, the elevated portions additionally comprise a plurality of half-cylindrical elements 44 which extend upwardly away from the bowed surface 45. In an embodiment, the half-cylindrical elements 44 are disposed in a radially extending pattern, moving radially outward from the central portion 43 and toward the peripheral portions 47. In an embodiment, some or all of the half-cylindrical elements 44 may have a lateral curvature, particularly if the central portion 43 has a curvature (i.e. is a circle or an oval). That is, the half-cylindrical elements 44 may curve laterally about the curvature of the central portion 43.

In an embodiment, the depth of each half-cylindrical element 44 increases, moving from the innermost half-cylindrical element 44 (nearest the central portion 43) to the outermost half-cylindrical elements 44. This feature can be seen in cross-section in FIG. 8. The depth $D_1$ of the half-cylindrical element 44 shown on the inner (shown on left) side of the insert 14 is less than the depth $D_2$ of the half-cylindrical element 44 shown in a position which is outer of it. The depth $D_3$ of the next outwardly positioned half-cylindrical element 44 is greater, and the depth $D_4$ of the outermost half-cylindrical element 44 is greater than each of the other half-cylindrical elements 44. In an embodiment, the length and/or width of one or more of the half-cylindrical elements 44 may increase moving from the innermost half-cylindrical element 44 (nearest the central portion 43) to the outermost half-cylindrical elements 44.

In an embodiment, because the surface 45 of the insert 14 may be convex, the increasing depth of the half-cylindrical elements 44, as one moves from the innermost half-cylindrical element 44 (nearest the central portion 43) to the outermost half-cylindrical elements 44, creates a horizontal surface 63 to support a food product. That is, the depth of the half-cylindrical elements 44 may be configured to correspond to the curvature of the surface 45 of the insert 14 to provide a food surface 63 which is horizontal or substantially horizontal (see FIGS. 7 and 8). This prevents food products from sliding or rolling toward the outward edges of the tray 12.

Figure 9A:
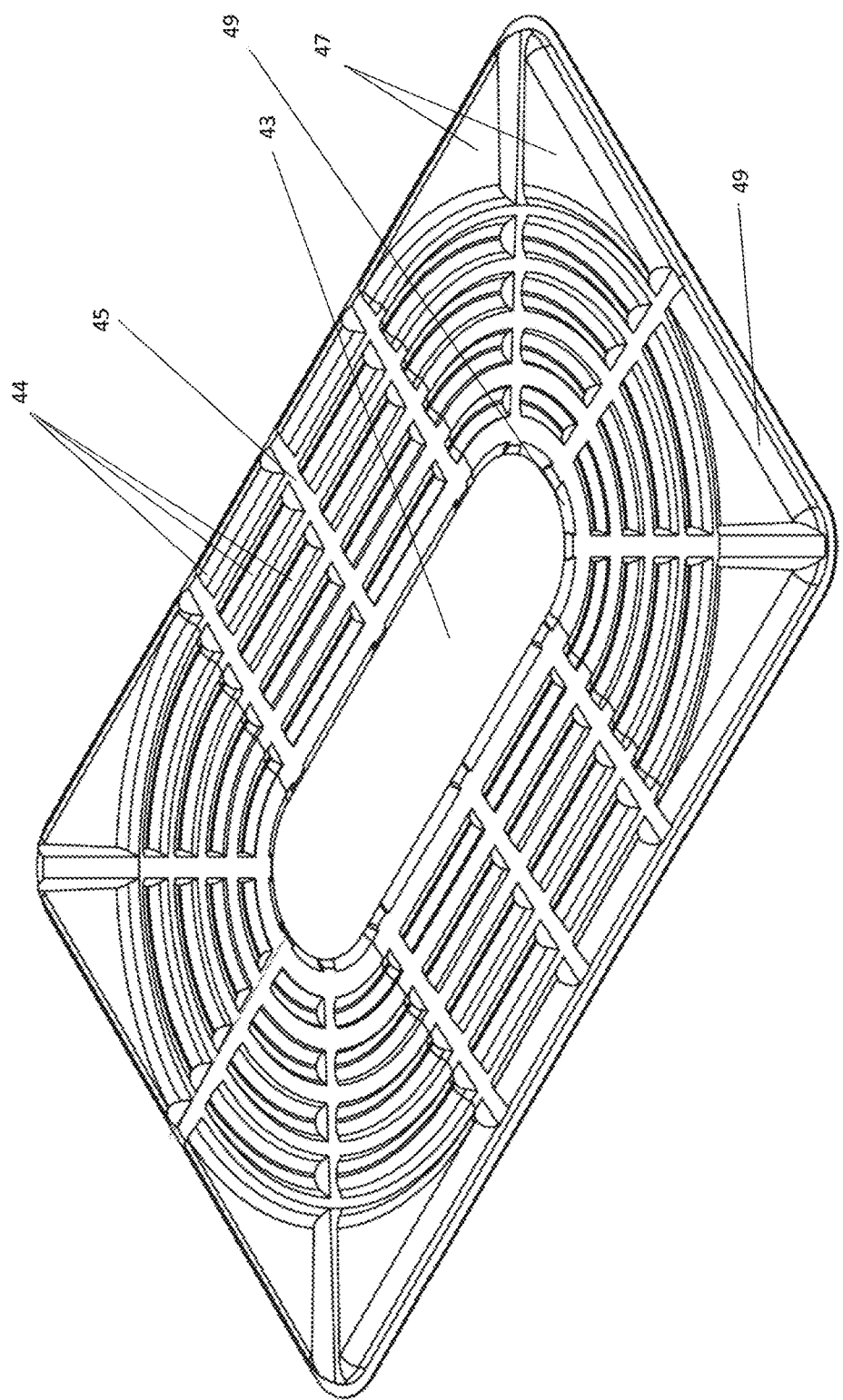
FIG. 9A illustrates a perspective view of the insert in an embodiment of the invention.
Figure 9B:
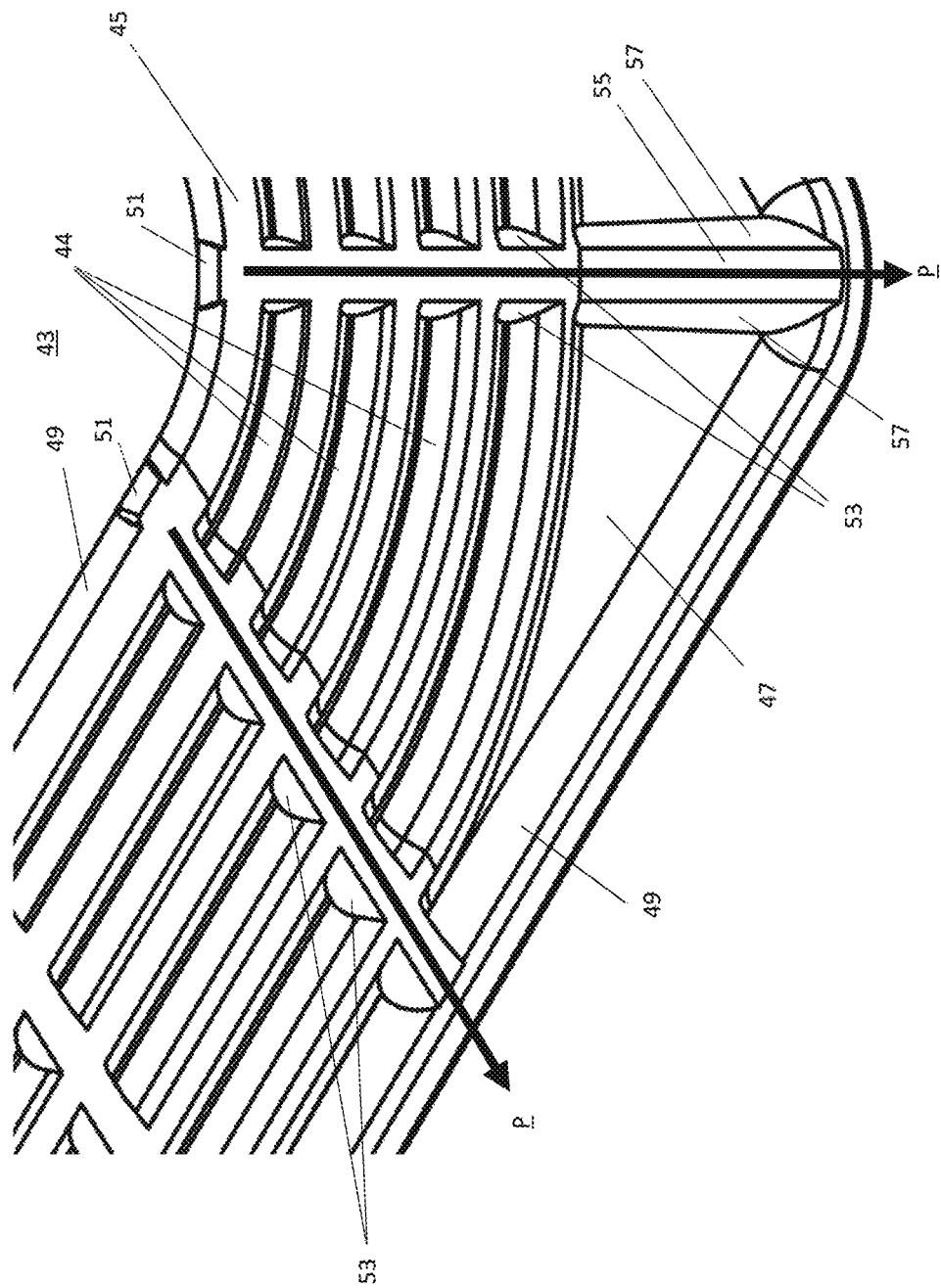
FIG. 9B illustrates an exploded perspective view of the insert in an embodiment of the invention.

In an embodiment, each half-cylindrical element 44 may create a path P between it and the adjacent half-cylindrical element 44 (see FIG. 9B). For example, each half-cylindrical element 44 may have a longitudinal wall 53. The longitudinal wall 53 may be curved, angled, or flat with respect to the surface 45. In an embodiment, an obtuse angle may be formed between the longitudinal wall 53 and the surface 45. The disposition of the longitudinal wall 53 may encourage extrudate to flow through the path P created between the longitudinal wall 53 and the adjacent longitudinal wall 53.

Figure 10A:
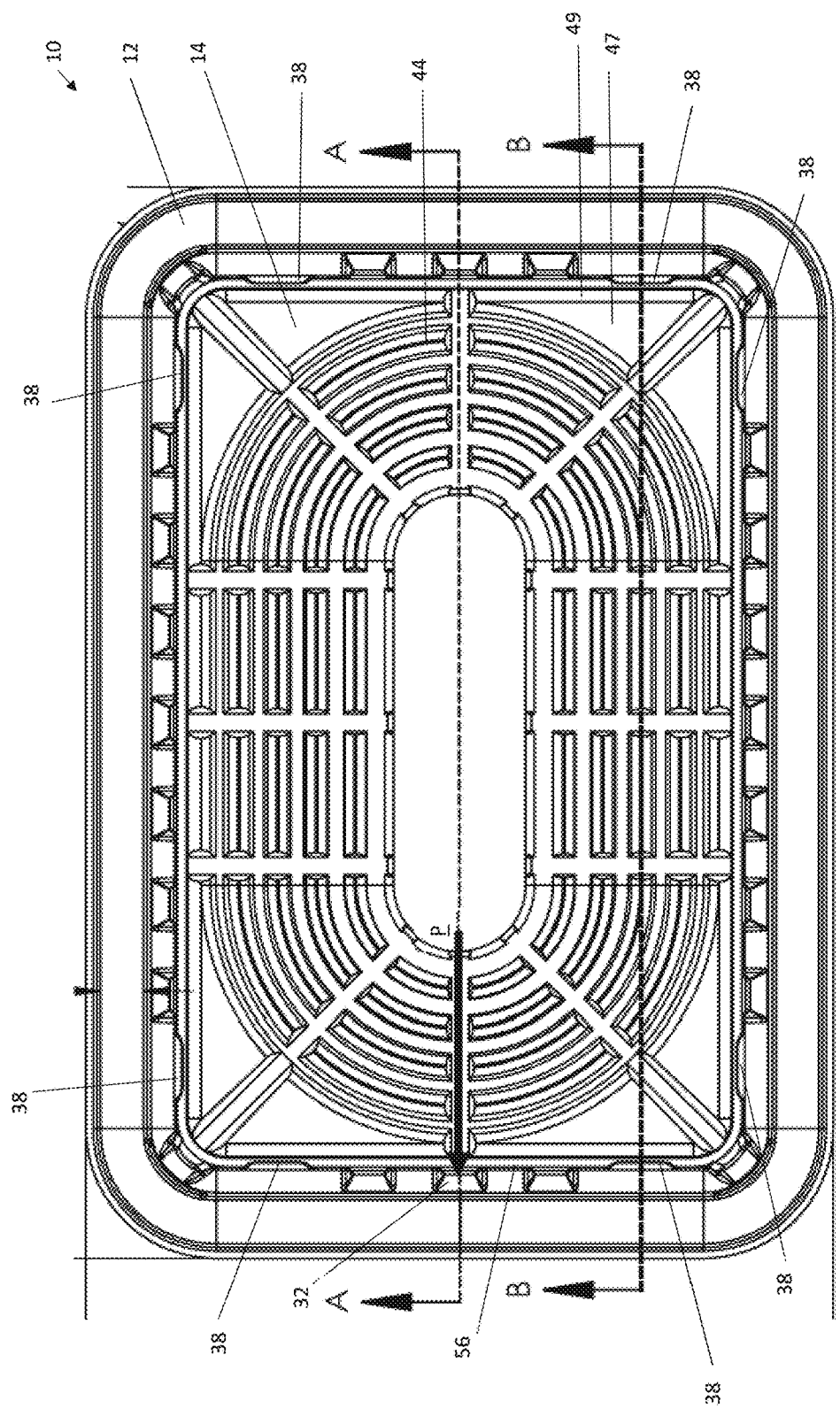
FIG. 10A illustrates a top view of the tray and insert in an embodiment of the invention.

In an embodiment shown in FIGS. 10A-10C, the surface 45 of the insert 14 terminates in a peripheral flange 56. The peripheral flange 56 may be fully circumferential (i.e. disposed along all sides of the insert 14), may be present on two sides of the insert 14, or may comprise a plurality of flanges 56 positioned along the periphery of two or more sides of the insert 14. In an embodiment, the flange 56 may be substantially rectangular or square and may have rounded edges. The flange 56 may extend horizontally outward from the surface 45 in an embodiment.

FIG. 10B illustrates a cross-section through a peripheral elevated portion 47 of the insert (line B-B in FIG. 10A). In this embodiment, the peripheral elevated portion 47 terminates near the flange in a convex curved portion 49. Thus, in this embodiment, the flange 56 extends peripherally and horizontally from the convex curved portion 49. In FIG. 10C, the cross-section is shown between two peripheral elevated portions 47 (line A-A in FIG. 10A). The FIG. 10C cross-section illustrates the surface 45. The surface 45 connects to the flange 56 though a substantially vertical connecting member 59.

The produce container 10 may be assembled as follows. The insert 14 may be placed within the tray and locked into place. To secure the insert 14 within the tray 12, the insert flange 56 may be snapped into place under the tray detents 38 so that the flange 56 is held down by the detents 38 as best shown in FIG. 10B. This arrangement locks the insert 14 in place and prevents it from falling out of the tray 12 or becoming dislodged when the container 10 is tilted.

When the insert 14 is locked into place, the insert 14 and tray 12 define a reservoir 16 between the insert 14 and the tray bottom wall 18. The insert 14 rests on the tray bottom wall 18 or, more particularly, on the raised areas 34, 40 of the tray bottom wall 18. As shown in FIG. 10A, the path P of the extrudate may, in an exemplary manner, flow from the food product resting upon the central portion 43 of the insert 14, between respective longitudinal walls 53 of adjacent half-cylindrical elements 44, over the flange 56, and through a flute 32. Referring now to FIG. 4, the extrudate may then follow a path P which is forced around a dam 23, through a second channel 27 between peripheral raised areas 40, and toward the first channel 25 which circumvents the central raised area 34 of the tray 12. The skilled artisan will understand that many extrudate paths are possible.

The accompanying figures are provided for explanatory purposes and may not show all components described herein with respect to embodiments of the system. In addition, those components that are illustrated are not necessarily drawn to scale.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An insert configured for positioning within a tray, the insert comprising:
   a bowed surface, the bowed surface defining a peripheral edge extending about a perimeter of the bowed surface, wherein the peripheral edge is aligned with a horizontal plane and wherein a midsection, centrally located inward from the peripheral edge is displaced from the horizontal plane; and
   a plurality of elevated portions extending upwardly from the bowed surface, wherein a top of each of the plurality of elevated portions define a horizontal food surface, wherein the horizontal food surface is not parallel to the bowed surface,
   wherein the plurality of elevated portions each define a depth, wherein the depth of each of the plurality of elevated portions increase, moving from an innermost portion nearest the midsection to an outer most portion, nearest the peripheral edge of the bowed surface.

2. The insert of claim 1, wherein the plurality of elevated elements are disposed in a radially extending pattern.

3. The insert of claim 1, wherein a channel is formed between one of the plurality of elevated portions an adjacent elevated portion.

4. The insert of claim 3, wherein the channel is formed between an angled portion of the plurality of elevated portions and the bowed surface, wherein an obtuse angle is formed between the angled portion and the bowed surface.

5. The insert of claim 1, wherein an angle is formed between the horizontal plane and the midsection of the bowed surface, and wherein the angle is between about 1 degree and about 5 degrees.

6. The insert of claim 1, wherein an angle is formed between the horizontal plane and the midsection of the bowed surface, and wherein the angle is between about 1 degree and about 3 degrees.

7. The insert of claim 1, wherein an angle is formed between the horizontal plane and the midsection of the bowed surface, and wherein the angle is between about 2 degrees.

8. The insert of claim 1, wherein the bowed surface 45 is convex.

9. The insert of claim 1, further comprising a central elevated portion, wherein the central elevated portion is positioned about the midsection of the bowed surface; and
at least one peripheral elevated portion.

10. The insert of claim 9, wherein the angle between a horizontal plane and the central elevate portion is between about 1 degree and about 5 degrees.

11. The insert of claim 9, wherein the angle between a horizontal plane and the central elevate portion is between about 1 degree and about 3 degrees.

12. The insert of claim 9, wherein the at least one peripheral elevated portion comprises at least four peripheral elevated portions located at or near the four corners of the insert.

13. The insert of claim 12, wherein channels are disposed between adjacent peripheral elevated portions.

14. The insert of claim 12, wherein the central elevated portion and the peripheral elevated portions connect to the surface of the insert via a convex curved portion.

15. The insert of claim 14, wherein one or more central portion channels are disposed within the convex curved portion.

16. The insert of claim 1, wherein each of the plurality of elevated portions is a half-cylindrical element.

17. The insert of claim 1, wherein the elevated portions additionally comprise a plurality of half-cylindrical elements which extend upwardly away from the bowed surface.

18. The insert of claim 17, wherein the plurality of half-cylindrical elements are disposed in a radially extending pattern, moving radially outward from the central portion and toward the peripheral portions.

19. The insert of claim 18, wherein the depth of each half-cylindrical element increases, moving from the innermost half-cylindrical element, nearest the central portion 43, to the outermost half-cylindrical elements.

20. The insert of claim 19, wherein the depth of the half-cylindrical elements is configured to correspond to a curvature of the bowed surface to provide a food surface atop the elevated portions which is horizontal or substantially horizontal.

* * * * *